(12) United States Patent
Carbone et al.

(10) Patent No.: US 12,728,727 B2
(45) Date of Patent: Sep. 8, 2026

(54) METHOD AND SYSTEM FOR CONTROLLING WHEEL SLIP WITH MIXING OF THE DISSIPATIVE BRAKING TORQUE AND THE REGENERATIVE BRAKING TORQUE IN A BRAKING SYSTEM WITH B-B-W TECHNOLOGY OF A VEHICLE

(71) Applicant: BREMBO S.p.A., Curno (IT)

(72) Inventors: Fabio Carbone, Curno (IT); Fabrizio Forni, Curno (IT)

(73) Assignee: Brembo S.p.A., Curno (IT)

(*) Notice: Subject to any disclaimer, the term of this patent is extended or adjusted under 35 U.S.C. 154(b) by 341 days.

(21) Appl. No.: 18/692,506

(22) PCT Filed: Sep. 16, 2022

(86) PCT No.: PCT/IB2022/058760
§ 371 (c)(1),
(2) Date: Mar. 15, 2024

(87) PCT Pub. No.: WO2023/042138
PCT Pub. Date: Mar. 23, 2023

(65) Prior Publication Data

US 2024/0383340 A1 Nov. 21, 2024

(30) Foreign Application Priority Data

Sep. 17, 2021 (IT) ........................ 102021000023978

(51) Int. Cl.
*B60L 3/00* (2019.01)
*B60L 3/10* (2006.01)
*B60L 7/26* (2006.01)

(52) U.S. Cl.
CPC ............... *B60L 3/108* (2013.01); *B60L 3/102* (2013.01); *B60L 7/26* (2013.01); *B60L 2240/465* (2013.01); *B60L 2240/647* (2013.01)

(58) Field of Classification Search
CPC .. B60L 3/102; B60L 3/108; B60L 7/26; B60L 2240/465; B60L 2240/647
(Continued)

(56) References Cited

U.S. PATENT DOCUMENTS 10,518,775 B1 * 12/2019 Velazquez Alcantar ..................... B60L 15/2045
11,654,875 B2 * 5/2023 Yao .......................... B60L 7/26 701/71

(Continued)

FOREIGN PATENT DOCUMENTS

DE 102020107052 A1 9/2020

OTHER PUBLICATIONS

European Patent Office, International Search Report, issued in PCT/IB2022/058760, Dec. 12, 2022, Rijswijk, NL.

*Primary Examiner* — Christopher P Schwartz
(74) *Attorney, Agent, or Firm* — Marshall & Melhorn, LLC

(57) ABSTRACT

A method for controlling wheel slip in a braking system of a vehicle involves receiving, by a wheel slip control sub-module of a wheel slip main control module a first plurality of input information, determining, by the wheel slip control sub-module, a braking torque request to be applied to a corner of the vehicle and a braking torque control component, providing the braking torque request, the braking torque control component, and an enabled wheel slip control confirmation value, to a braking regeneration sub-module of the main wheel slip control module, receiving, by the braking regeneration sub-module, a second plurality of input information, and determining a regenerative braking torque (Continued)

command as a function of the braking torque request or of the braking torque control component, based on a status of an enabling input signal. The braking regeneration sub-module determines a dissipative braking torque command as a function of the braking torque request and of the regenerative braking torque command.

12 Claims, 9 Drawing Sheets

(58) Field of Classification Search
USPC .......................................... 303/3, 15, 20, 152
See application file for complete search history.

(56) References Cited

U.S. PATENT DOCUMENTS

| | | | | |
|---|---|---|---|---|
| 12,441,316 | B2 * | 10/2025 | Kim | B60W 30/02 |
| 2014/0207355 | A1 | 7/2014 | Akaho et al. | |
| 2020/0189398 | A1 | 6/2020 | Sukuzi et al. | |
| 2021/0086623 | A1 | 3/2021 | Yao et al. | |

* cited by examiner

METHOD AND SYSTEM FOR CONTROLLING WHEEL SLIP WITH MIXING OF THE DISSIPATIVE BRAKING TORQUE AND THE REGENERATIVE BRAKING TORQUE IN A BRAKING SYSTEM WITH B-B-W TECHNOLOGY OF A VEHICLE

FIELD OF THE INVENTION

The present invention relates to a braking system of a vehicle, in particular to a method and respective system for controlling the wheel slip with mixing (blending) of the dissipative braking torque and the regenerative braking torque in a braking system with B-b-W technology of a vehicle.

BACKGROUND ART

Wheel slip control is very important in a vehicle and is added to the configuration of a braking system with B-b-W (standing for "Brake-by-Wire", braking by electrical connection) technology which, in this respect, must be able to guarantee a high level of control optimization and flexibility.

The most recent innovative architectures have suggested braking systems in which one or more electric motors are present which braking action (regenerative braking torque) is applied on an axle or wheel of the vehicle to which the electric motor is electrically connected, in addition to electronic braking systems with B-b-W technology, in which the braking action (dissipative braking torque) of a brake caliper on a wheel brake disc is achieved, for example, by using of one or more electromechanical or electrohydraulic actuators.

In these braking systems, the management of the dissipative braking torque and regenerative braking torque during wheel slip control (ABS activated) has a suboptimal level of integration and interaction in the management and distribution of braking torque between the two actuation systems (B-b-W and electric motors).

This limitation of integration and interaction between the two controls can lead to drawbacks and inefficiencies such as, for example:

- undesirable wheel control behaviors, which implies increased stopping distances;
- reduced regeneration action.

Furthermore, the lack of complete integration and interaction of the two actuation systems does not allow maximization of the regenerative contribution during a dissipative braking phase and causes inefficiencies in regenerative braking energy recovery and longitudinal vehicle performance (stopping distance degradation).

The braking systems for vehicles with two or more axles commonly found on the market have centralized actuation with an electrohydraulic "master cylinder".

In this type of system, the service braking function is performed by generating a single pressure in the front and rear hydraulic circuits.

The distribution of regenerative braking torque and dissipative braking torque between the rear and front axles, unless the active distribution system intervenes, is given by the design characteristics of the braking system on the two axles, which usually differ to achieve a sub-optimal distribution of braking forces.

During wheel slip control, the braking torque adjustment function is performed by solenoid valves which, by being appropriately controlled, adjust the pressure of the braking system on each wheel.

In electronic braking systems with B-b-W technology with axle and independent wheel architecture, the braking torque can be managed totally independently on each wheel.

This system is distinguished from the master cylinder systems by the absence of any physical constraint (hydraulic system) between the braking axles and the absence of valves to manage braking torque.

In this manner, the braking torque can be managed independently between individual wheels and axles to achieve optimal braking force distribution to the ground.

In the case of hybrid or electric vehicles, the integration of the regenerative braking action of electric motors with the dissipative braking torque action operated by an electronic braking system, either "master cylinder" or "Brake-by-Wire" with independent axles, is a technical challenge that braking system suppliers and system integrators are facing.

The current solution for "master cylinder" systems is to either exclude or severely limit the regeneration action with the result of favoring vehicle performance in terms of braking distances and directionality while penalizing energy recovery.

This limitation emerges both under service braking conditions in the absence of wheel slip and under braking conditions at the limit of grip where torque pressure adjustment with solenoid valves is required.

In light of the above, the need is currently felt to have a braking system equipped with an appropriately controlled distributed electronic braking system with B-b-W technology which, in combination with the regenerative braking action of the electric motors with which a vehicle is equipped, makes it possible to go beyond the aforesaid limitation by simultaneously maximizing both vehicle performance (dissipative braking torque), in terms of stopping distances, directionality and braking stability, and energy regeneration (regenerative braking torque).

SUMMARY OF THE INVENTION

It is the purpose of the present invention to devise and make available a method for controlling wheel slip with mixing (blending) of the dissipative braking torque and the regenerative braking torque in a braking system with B-b-W technology of a vehicle, which makes it possible to, at least partially, remedy the drawbacks described above with reference to the prior art, and in particular, which make it possible to optimize more effectively both vehicle performance (dissipative braking torque) in terms of stopping distances, directionality, and braking stability, and energy regeneration (regenerative braking torque) at the same time.

Such a purpose is achieved by a method as described and claimed herein.

It is a further object of the present invention a system for controlling wheel slip with mixing (blending) of the dissipative braking torque and the regenerative braking torque in a braking system with B-b-W technology of a vehicle.

Further advantageous embodiments are the object of the dependent claims.

BRIEF DESCRIPTION OF THE FIGURES

Further features and advantages of the method and system according to the invention will be apparent from the following description of preferred embodiments, given by way of indicative, non-limiting examples, with reference to the accompanying figures, in which.

It is worth noting that equal or similar elements in the figures will be indicated by the same numeric or alphanumeric references.

DESCRIPTION OF SOME PREFERRED EMBODIMENTS

Figure 1:
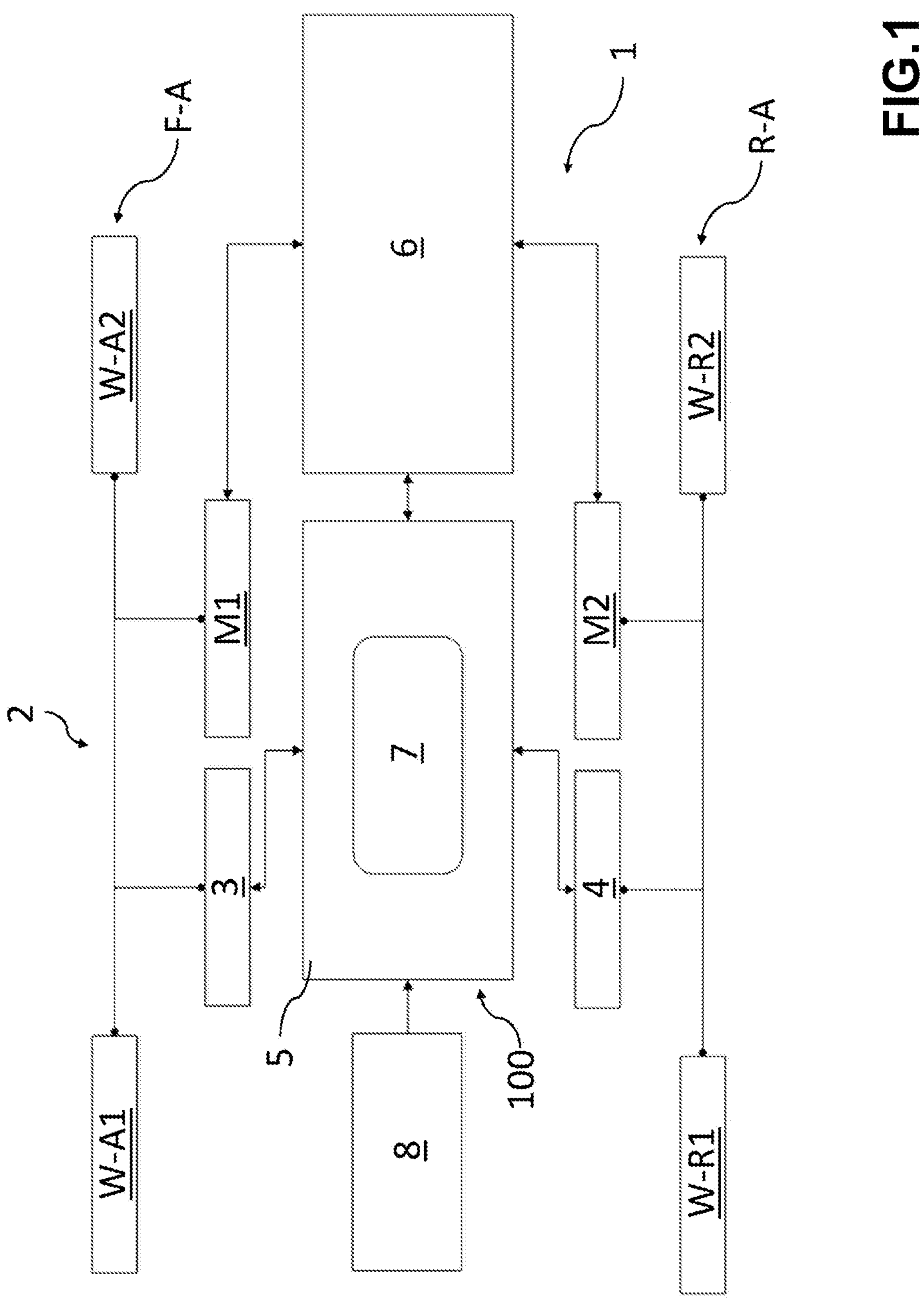
FIGS. 1-4 respectively shows, by means of a block diagram, an example of braking system architecture with B-b-W technology of a vehicle in which a system for controlling wheel slip with mixing of the dissipative braking torque and the regenerative brake torque of the present invention is employable.

With reference now to aforesaid figures, the reference numeral 100 indicates as a whole a system for controlling wheel slip with mixing (blending) of the dissipative braking torque and the regenerative brake torque in a braking system with B-b-W technology of a vehicle, hereinafter also simply control system or only system, according to the present invention.

As will be described in greater detail below, the "wheel slip control" according to the present invention makes use of the contribution of the dissipative brake torque and of the contribution of the regenerative brake torque in a braking system with B-b-W technology of a vehicle.

For the purposes of the present description, "vehicle" means any vehicle or motorcycle, also of commercial type, having two, three, four, or more wheels, shown only diagrammatically in FIGS. 1-4 and indicated as a whole by the reference numeral 1.

Furthermore, "braking system" means the whole of all the components (mechanical and/or electric or electronic, also the brake fluid) which contribute to generating the service braking of a vehicle or to generating the parking-braking of a vehicle.

Referring to FIGS. 1, 2, 3 and 4, the vehicle 1 comprises a first front axle F-A to which a first front wheel W-A1 and a second front wheel W-A2 are connected.

For example, the first front wheel W-A1 is the left front wheel and the second front wheel W-A2 is the right front wheel.

Furthermore, the vehicle 1 comprises a second rear axle R-A to which a first rear wheel W-R1 and a second rear wheel W-R2 are connected.

For example, the first rear wheel W-R1 is the left rear wheel while the second rear wheel W-R2 is the right rear wheel.

The vehicle 1 further comprises a braking system 2.

The braking system 2, in which the system 100 can be used, is an architecture with Brake-by-Wire (B-b-W) technology.

The braking system 2 comprises at least one first actuator module 3 operatively connected to the first front axle F-A.

The braking system 2 further comprises at least one second actuator module 4 operatively connected to the second rear axle R-A.

Each actuator module comprises one or more actuators for each wheel per axle.

Each actuator is adapted to implement a braking command based on the control received from a respective actuator control module.

For example, each actuator control module is a hardware module or software logic module in a main hardware module of the braking system 2 or, more in general, of the vehicle 1.

Each actuator is either an electro-mechanical type or an electro-hydraulic type.

In an embodiment shown in FIGS. 1, 2, 3 and 4, the at least one first actuator module 3 operatively connected to the first front axle F-A is operatively connected to both the first front wheel W-A1 and the second front wheel W-A2.

In this embodiment, the at least one second actuator module 4 operatively connected to the second rear axle R-A is operatively connected to both the first rear wheel W-R1 and a second rear wheel W-R2.

In an embodiment, in combination with any one of those described above, shown in FIGS. 1 and FIG. 3, the braking system 2, in addition to the at least one first actuator module 3 operatively connected to the first front axle F-A, further comprises at least one first electric motor M1 operatively connected to the first front axle F-A.

Furthermore, in this embodiment, the braking system 2, in addition to the at least one second actuator module 4 operatively connected to the second rear axle R-A, further comprises at least one second electric motor M2 operatively connected to the second rear axle R-A.

Each electric motor is adapted to provide a regenerative braking torque based on the control received from a respective electric motor control module.

For example, each electric motor control module is a hardware module or software logic module in a main hardware module of the braking system 2 or, more in general, of the vehicle 1.

According to a further embodiment, alternative to those just described with reference to FIGS. 1 and 3 and shown in FIGS. 2 and 4, the braking system 2 comprises at least one first electric motor M1 operatively connected to the first front wheel W-A1 and a further first electric motor M1' operatively connected to the second front wheel W-A2.

Furthermore, in this embodiment, the braking system 2 comprises at least one second electric motor M2 operatively connected to the first rear wheel W-R1 and a further second electric motor M2' operatively connected to the second rear wheel W-R2.

Again, in this embodiment, each electric motor is adapted to provide a regenerative braking torque required by the system 100 based on the control received from a respective electric motor control module.

For example, each electric motor control module is a hardware module or software logic module within a main hardware module of the braking system or, more in general, of the vehicle 1.

Returning in general to the braking system 2 in FIGS. 1, 2, 3 and 4, the system 100 comprises an electronic control unit 5 of the vehicle 1 (or vehicle control unit), ECU (electronic control unit), which will be described in detail below with reference to other figures as well.

The electronic control unit 5 is operationally connected to at least one first actuator module 3 and at least one second actuator module 4.

Figure 2:
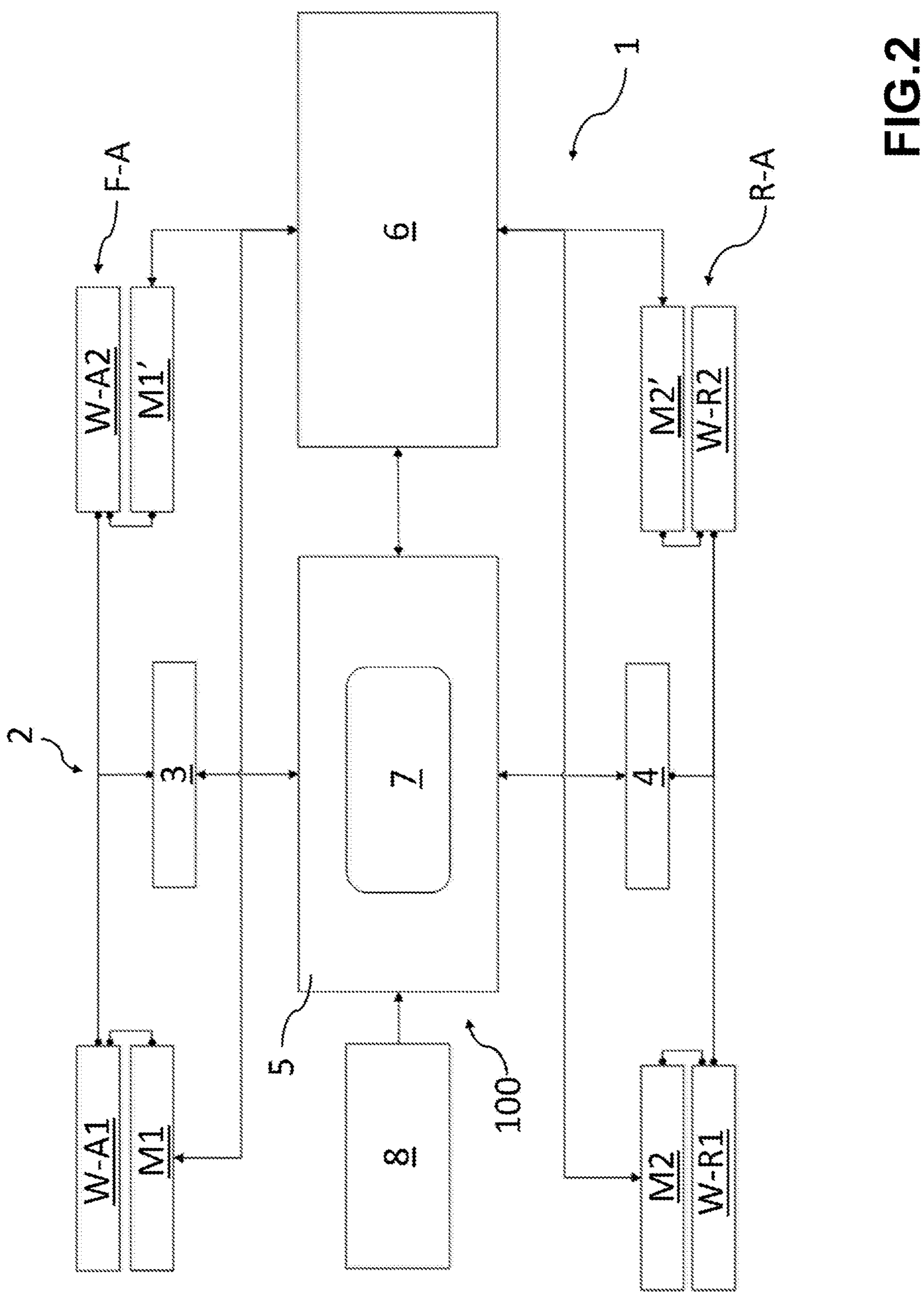

In an embodiment, shown in FIGS. 1 and 2, the electronic control unit 5 is connected directly to at least one first actuator module 3 and at least one second actuator module 4.

Figure 3:
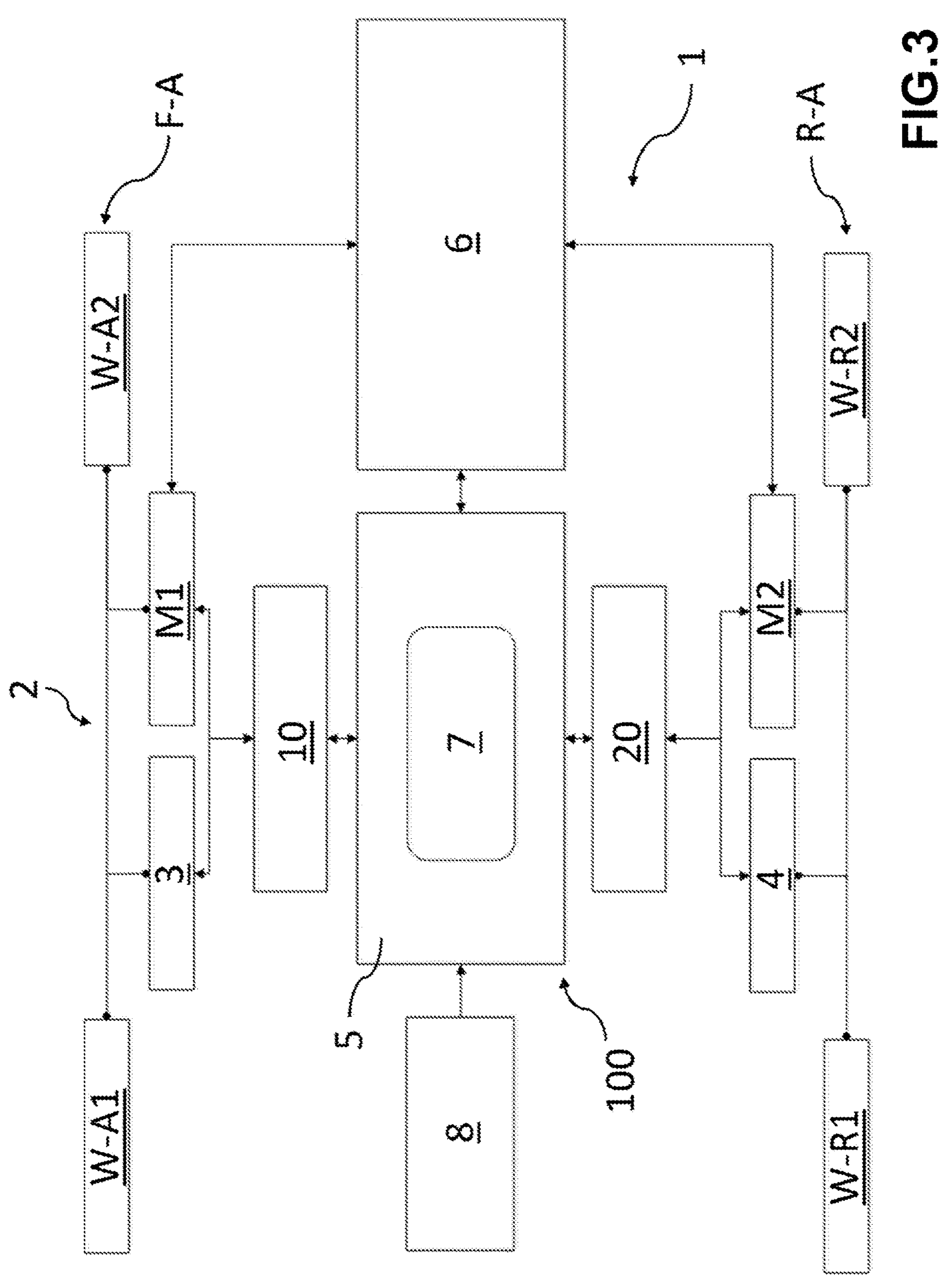
Figure 4:
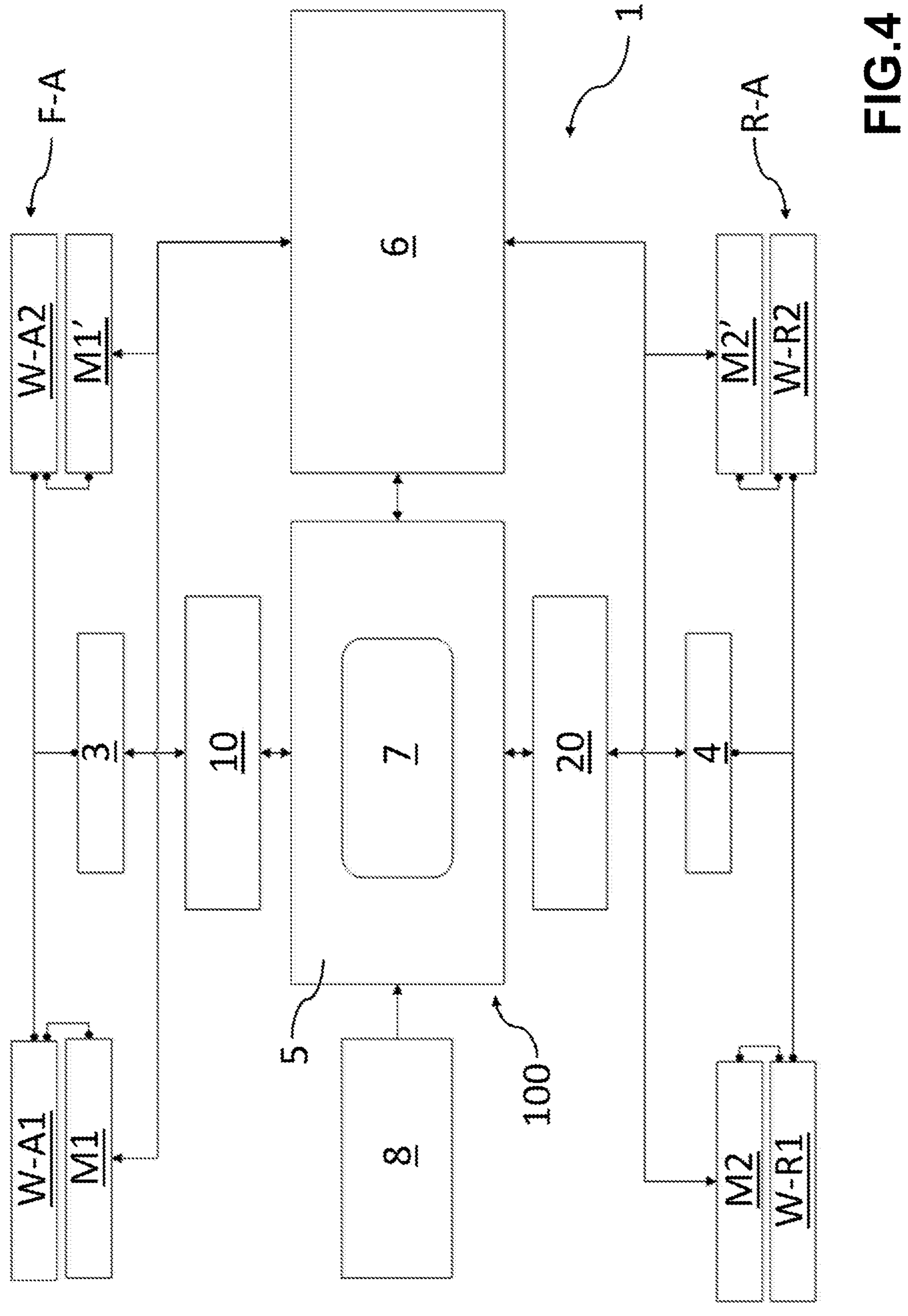

According to a further embodiment, shown in FIGS. 3 and 4, the braking system 2 comprises a first local control unit 10 operatively connected to the at least one first actuator module 3 and to the electronic control unit 5, and thus to the system 100.

The first local control unit 10 is a B-b-W technology control unit.

The electronic control unit 5 is operationally connected to the at least one first actuator module 3 through the first local control unit 10.

The first local control unit 10 is configured to control the at least one first actuator module 3 and thus the first front axle F-A.

For example, the first local control unit 10 is a hardware module or software logic within a first main hardware module of the braking system 2 or, more in general, of the vehicle 1.

Furthermore, in this embodiment, the braking system 2 comprises a second local control unit 20 operatively connected to the second front axle R-A and to the electronic control unit 5, and thus to the system 100.

The second local control unit 20 is a B-b-W technology control unit.

The electronic control unit 5 is operationally connected to the at least one second actuator module 4 through the second local control unit 20.

The second local control unit 20 is configured to control the at least one second actuator module 4 and thus the second rear axle R-A.

For example, the second local control unit 20 is a hardware module or software logic within a main hardware module of the braking system 2 or, more in general, of the vehicle 1.

In the embodiment in FIG. 3, the first local control unit 10 is configured to control the at least one first actuator module 3 while the second local control unit 20 is configured to control the at least one second actuator module 4.

In an embodiment, in combination with any of those described above, shown in FIGS. 1, 2, 3 and 4, the system 100 further comprises a traction and regenerative braking control module 6 or ePWT (Electric Powertrain) control module.

The traction and regenerative braking control module 6 is operatively connected to the electronic control unit 5.

In an embodiment, shown in FIGS. 1, 2, 3 and 4, the electronic control unit 5 is operationally connected to the at least one first electric motor M1 and the at least one second motor M2.

According to an embodiment, shown in FIGS. 1 and 2, the electronic control unit 5 is operationally connected to the at least one first electric motor M1 and the at least one second electric motor M2 through the traction and regenerative braking control module 6.

According to a further embodiment, in combination with the preceding one and shown in FIGS. 2 and 4, in which the braking system 2 further comprises the further first electric motor M1' and the further second electric motor M2', the electronic control unit 5 is operationally connected to the at least one first electric motor M1, the further first electric motor M1', the at least one second electric motor M2, and the further second electric motor M2' through the traction and regenerative braking control module 6.

According to a further embodiment, as an alternative to the preceding ones and shown in FIG. 3, in which the braking system 2 comprises the first local control unit 10 and the second local control unit 20, the electronic control unit 5 is operationally connected to the at least one first electric motor M1 through the traction and regenerative braking control module 6 and through the first local control unit 10.

In this embodiment, the electronic control unit 5 is operationally connected to at least one second electric motor M2 through the traction and regenerative braking control module 6 and through the second local control unit 20.

Returning to the system 100 in general, according to an embodiment, shown in FIGS. 1, 2, 3 and 4, the electronic control unit 5 further comprises a main wheel slip control module 7 with mixing (blending) of the dissipative braking torque and the regenerative braking torque, hereafter also simply main wheel slip control module 7.

Wheel slip means the behavior of a wheel due to the relative difference between wheel speed and vehicle speed.

For example, the main wheel slip control module 7, described hereafter with reference also to other figures, is a hardware module or a software logic within a main hardware module of the braking system 2 or, more in general, of the vehicle 1.

According to an embodiment, shown in FIGS. 1, 2, 3, and 4, the system 100 further comprises a sensor unit 8 operationally connected to the electronic control unit 5.

The "sensor unit" of the system 100 means the set of:

- a first plurality of sensors distributed in the vehicle 1 outside of braking system 2 with B-b-W technology and respective data communication networks distributed in the vehicle 1 which can be employed to transmit the signals detected by the first plurality of sensors to system 2 with B-b-W technology; examples of sensors belonging to the first plurality of sensors are: inertial platform from which the value of vehicle accelerations in the three directions can be obtained; wheel speed detection sensors from which the vehicle wheel speed can be obtained;
- a second plurality of sensors distributed in the braking system 2 with B-b-W technology; examples of sensors belonging to the second plurality of sensors are: brake fluid pressure sensors within the braking system; brake caliper clamping force detection sensors; temperature sensors of the windings of the electric motors in the braking system with B-b-W technology; rotor position sensors of the electric motors of the braking system with B-b-W technology; and wheel braking torque detection sensors.

Figure 5:
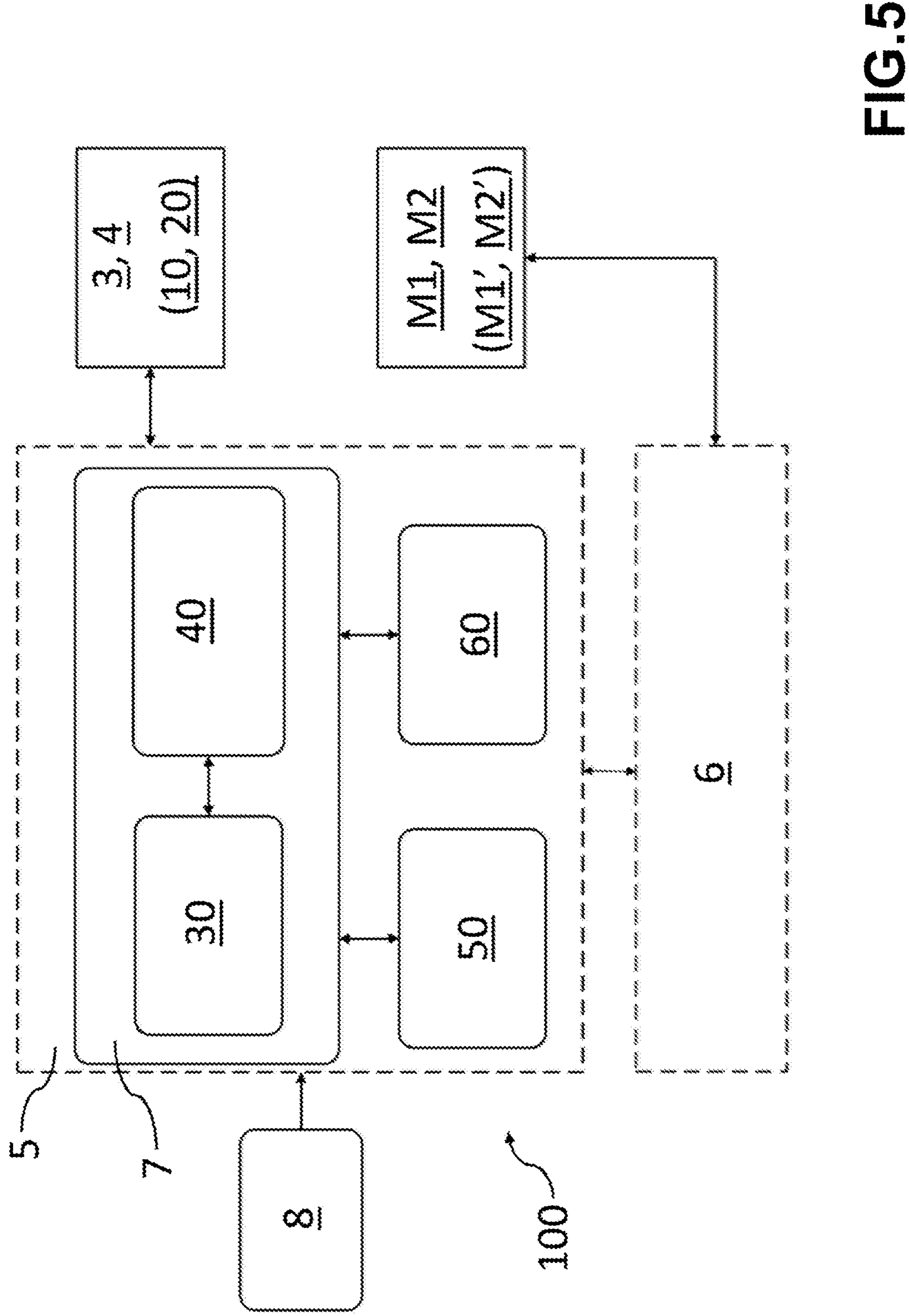
FIG. 5 shows, by means of a block diagram, a system for controlling wheel slip with mixing of the dissipative braking torque and the regenerative braking torque in a braking system with B-b-W technology of a vehicle according to the present invention.

With reference now also to the functional diagram in FIG. 5, the system 100 for controlling wheel slip with mixing of dissipative braking torque and regenerative braking torque in a braking system with B-b-W technology of a vehicle according to the present invention is now described in more detail.

The main wheel slip control module 7 comprises a wheel slip control sub-module 30.

Furthermore, the main wheel slip control module 7 comprises a braking regeneration sub-module 40.

The wheel slip control sub-module 30 and the braking regeneration sub-module 40 are operationally connected to each other.

For example, the wheel slip control sub-module 30, described hereafter, is a hardware module or a software logic within a main hardware module of the braking system 2 or, more in general, of the vehicle 1.

For example, the braking regeneration sub-module 40, also described in greater detail below, is a hardware module or a software logic within a main hardware module of the braking system 2 or, more in general, of the vehicle 1.

With reference again to FIG. 5, the electronic control unit 5 further comprises a control sub-module 50 of the braking system 2 with B-b-W technology, operationally connected to the main wheel slip control module 7.

For example, the control sub-module 50 of the braking system 2 with B-b-W technology is a hardware module or a software logic within a main hardware module of the braking system 2 or, more in general, of the vehicle 1.

The control sub-module 50 of braking system 2 with B-b-W technology is configured, through the execution of respective program codes, to determine forces for basic braking (dissipative braking) based on a braking demand provided by the driver of the vehicle 1 and/or from autonomous braking systems with which vehicle 1 may be equipped.

Furthermore, the electronic control unit 5 further comprises a vehicle state estimation sub-module 60, which is operationally connected to the main wheel slip control module 7.

For example, the vehicle status estimation sub-module 60 is a hardware module or a software logic within a main hardware module of the braking system 2 or, more in general, of the vehicle 1.

The vehicle status estimation sub-module 60 is configured, through the execution of respective program codes, to estimate information representative of the status of the vehicle 1 to be provided to the main wheel slip control module 7.

Figure 6:
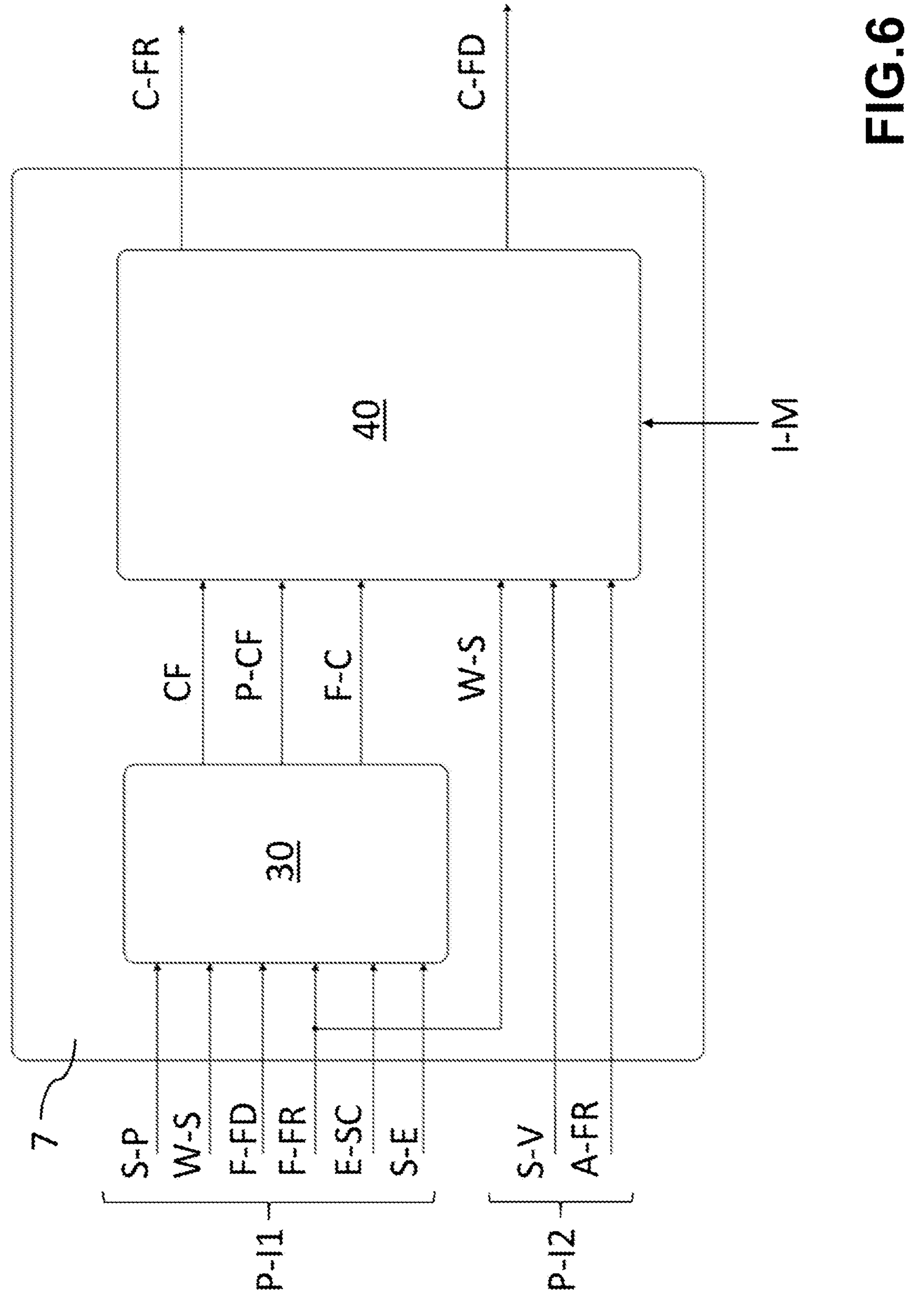
FIG. 6 shows, by means of a block chart, a functional block of the system in FIG. 5.

With reference to FIG. 6, the wheel slip control sub-module 30 is configured to receive as input a first plurality of input information P-I1 for controlling wheel slip, hereafter also only first plurality of input information P-I1.

For the purposes of the present description, "first plurality of input information P-I1 for controlling wheel slip" means information essential for controlling wheel slip according to the present invention, such as information detected and/or estimated by detection devices (real or virtual sensors) installed on the vehicle, thus also on the corners (front or rear of the vehicle), but not necessarily only related to the braking system of the vehicle 1 and/or information processed during wheel slip control.

The first plurality of input information P-I1 comprises:

- a wheel slip set-point value S-P;
- a value of wheel slip condition W-S;
- a dissipative braking torque feedback value F-FD; this value can be an estimate based on a representative braking fluid pressure information and/or a representative brake caliper clamping force information from a brake fluid pressure sensor in the braking system and/or a brake caliper clamping force detection sensor, respectively.
- a regenerative braking torque feedback value F-FR; this value is an information from the traction and regenerative braking control module 6 (ePWT control module) or generally from an ePWT control system/unit;
- a wheel slip control enabling value E-SC;
- an information representative of one or more vehicle discrete events S-E; "discrete events" mean vehicle events/instructions which are outputs of the vehicle status estimation sub-module 60, e.g., such as changes in vehicle road grip (e.g., split, jump, and so on), parking maneuvers, and so on.

The wheel slip set-point value S-P is a function of the speed of the vehicle 1, of the road grip of the vehicle 1, and of the actuation speed of the brake pedal of the vehicle 1.

It is worth noting that the wheel slip set-point value S-P is variable on a case-by-case basis depending on vehicle conditions.

In more detail, the wheel slip set-point value S-P is the result of a calculation function, which analyzes the vehicle and road conditions and defines the most appropriate set-point.

The wheel slip control sub-module 30 is configured to determine a braking torque request CF to be applied to a corner of the vehicle 1 and a braking torque control component P-CF, based on the first plurality of input information P-I1 received.

"Braking torque control component" means an integral component of braking torque control such as, for example, a low-frequency/low-dynamic component of a braking torque control variable.

The wheel slip control sub-module 30 is configured to provide the braking torque request CF to be applied on a corner of the vehicle 1, the determined braking torque control component P-CF and an enabled wheel slip control confirmation value F-C to the braking regeneration sub-module 40.

The braking regeneration sub-module 40 is configured to receive as input the braking torque request CF to be applied on a corner of the vehicle 1, the braking torque control component P-CF provided by the wheel slip control sub-module 40, and the enabled wheel slip control confirmation value F-C.

Furthermore, the braking regeneration sub-module 40 is configured to receive a second plurality of input information P-I2 for controlling wheel slip, later also only a second plurality of input information P-I2.

For the purposes of the present description, "second plurality of input information P-I1 for controlling wheel slip" means information essential for controlling wheel slip according to the present invention, such as information detected and/or estimated by detection devices (real or virtual sensors) installed on the vehicle, thus also on the corners (front or rear of the vehicle), but not necessarily only related to the braking system of the vehicle 1 and/or information processed during wheel slip control.

The second plurality of input information P-I2 comprises:

- the wheel slip condition value W-S;
- at least one vehicle status estimation value S-V, such as the estimate value of grip of the vehicle on the road;
- an available regenerative braking torque value A-FR. Such value is made available by the traction and regenerative braking control module 6 to the main wheel slip control module 7 through a data communication network or dedicated electrical connection.

The braking regeneration sub-module 40 is configured to determine a regenerative braking torque command C-FR as a function of the braking torque request CF to be applied to the corner of the vehicle 1 or of the braking torque control component P-CF, based on the status of an input enabling signal I-M, and as a function of the second plurality of input information P-I2 and the enabled wheel slip control confirmation value F-C received from the wheel slip control sub-module 30.

If the status of the enabling input signal I-M is disabled, the braking regeneration sub-module 40 is configured to determine the regenerative braking torque command C-FR as a function of the braking torque request CF.

If the status of the enabling input signal I-M is enabled, the braking regeneration sub-module 40 is configured to determine the regenerative braking torque command C-FR as a function of the braking torque control component P-CF.

Furthermore, the braking regeneration sub-module 40 is configured to determine a dissipative braking torque command C-FD as a function of the braking torque request CF and the regenerative braking torque command C-FR determined by the braking regeneration sub-module 40.

Figure 7:
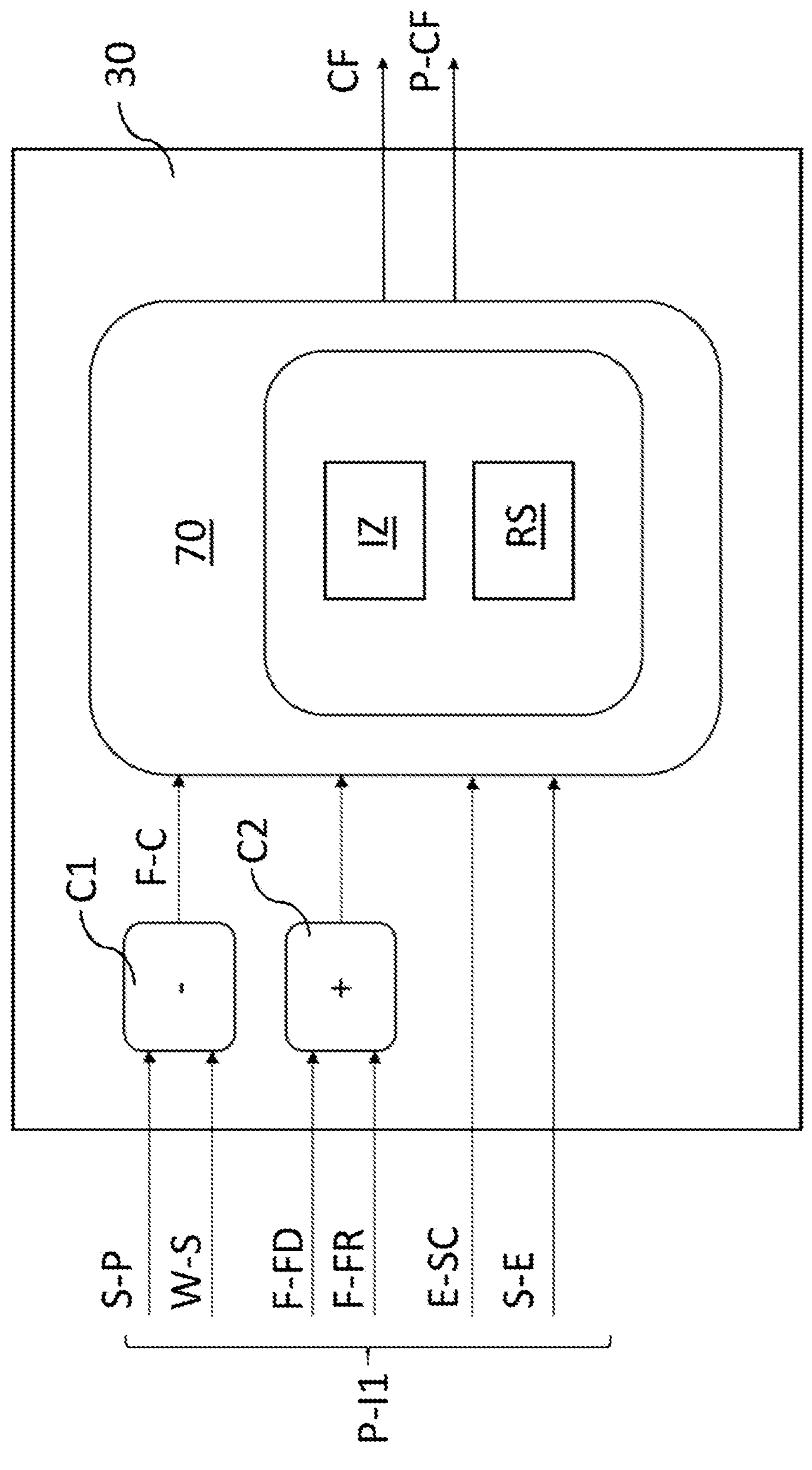
FIG. 7 shows, by means of a functional block chart, a first functional sub-block of the functional block in FIG. 6.

Referring now to FIG. 7, according to an embodiment, the wheel slip control sub-module 30 comprises a wheel slip control block 70.

The slip control block 70 is configured to act on a single wheel corner of the vehicle 1.

Therefore, the wheel slip control sub-module 30 comprises a wheel slip control block 70 for each wheel corner of the vehicle 1.

For the sake of brevity of description, reference will be made hereafter only to one wheel slip control block 70 of a single wheel corner of the vehicle 1 keeping in mind that the description of a single wheel slip control block 70 and the wheel slip control sub-module 30 with reference to the single wheel slip control block 70 is valid for any other wheel slip control block 70 present on another wheel corner of the vehicle 1.

For example, the slip control block 70 is a hardware module or software logic module in a main hardware module or PID controller or discrete and non-linear software logics in a main hardware module of the braking system 2 or, more in general, of the vehicle 1.

The slip control sub-module 30 is configured to verify the activation of wheel slip control.

In this regard, in an embodiment, shown in FIG. 7, the wheel slip control sub-module 30 further comprises a comparison block C1 configured to compare the wheel slip condition value W-S with the wheel slip set-point value S-P.

The result of the comparison performed by the wheel slip control sub-module 30 either enables or disables the activation of wheel slip control.

For example:

If W-S≥S-P then F-C is set as a flag on "true".

The slip control block 70 is configured to perform, after verifying the wheel slip control activation, a step of initializing IZ the braking torque control component P-CF.

Furthermore, after an activation of the wheel slip control and the detection of set vehicle discrete events S-E (such as negative or positive jumps in road grip, splits or activations of other control modules interacting with the system (e.g., a vehicle stability control), the wheel slip control block 70 is configured to perform a step of resetting AZ the braking torque control component P-CF.

The slip control block 70, in the step of initializing, is configured to determine a value of the braking torque control component P-CF as a function of the dissipative braking torque feedback value F-FD, the regenerative braking torque feedback value F-FR, and an initial value IQ.

The initial value IQ is a function of the grip of the vehicle 1, of the axle of the vehicle 1, of the wheel slip condition value W-S, of a discrete vehicle event type.

In more detail, the initial value IQ is an output of a function/Look-Up Table which, based on the dissipative braking torque feedback value F-FD and the regenerative braking torque feedback value F-FR, provides a value representing a "cut-off" percentage to be applied to the sum of the dissipative braking torque feedback value F-FD and the regenerative braking torque feedback value F-FR. For example, the "cutoff" percentage is a value comprised between 0.1 and 1 where 0.1 is 10% to be applied to the sum of the dissipative braking torque feedback value F-FD and the regenerative braking torque feedback value F-FR.

In this regard, in an embodiment, the wheel slip control sub-module 30 further comprises an adder block C2 configured to add the dissipative braking torque feedback value F-FD to the regenerative braking torque feedback value F-FR.

In this embodiment, the slip control block 70, in the step of initializing, is configured to determine a value of the braking torque control component P-CF by applying the following mathematical relationship:

$$P\text{-}CF = (F\text{-}FD + F\text{-}FR) \times IQ \qquad (1)$$

The slip control block 70, in the step of resetting, is configured to determine a value of the braking torque control component P-CF as a function of the dissipative braking torque feedback value F-FD, the regenerative braking torque feedback value F-FR, and an initial value IQ (defined above).

In this regard, in an embodiment, in which the wheel slip control sub-module 30 comprises the adder block C2 configured to add the dissipative braking torque feedback value F-FD to the regenerative braking torque feedback value F-FR, the wheel slip control block 70, also in the step of resetting, is configured to determine a value of the braking torque control component P-CF by applying the mathematical relationship (1).

It is worth noting that the step of resetting is performed in the presence of discrete vehicle event detection to make the wheel slip control change faster in the face of rapid changes in operating conditions.

The slip control block 70 is configured to determine, after the steps of initializing and resetting, in a closed loop, the braking torque request CF and the braking torque control component P-CF by minimizing the error between the wheel slip condition value W-S and the wheel slip set-point value S-P.

It is worth noting that "closed-loop determination" means a control mode, known in itself, in which a set-point value (desired value) of a quantity is compared with its measured value (in this case, the wheel slip set-point value S-P and the wheel slip condition value W-S) and the value of the control quantity (in this case, the braking torque request CF and the braking torque control component P-CF) is defined as the output of the control logic.

It is worth noting that the braking torque request CF is the result of calculating different control actions (e.g., proportional, integral, derivative, nonlinear).

In more detail, the request for braking torque can result from any control logic applicable to wheel slip control.

The Applicant points out that one of the inventive aspects of the present invention, besides the manner of calculating the braking torque (wheel slip control), as the possibility of considering only one of its braking torque control components (e.g., a lower frequency portion) which can be used for the regeneration and a higher frequency portion for the dissipative braking portion.

For example, the braking torque control component P-CF is an integral part.

In more detail, said integral part is a lower frequency component of the control/braking torque variable calculated by the wheel slip logic.

This component is used afterward in the main wheel slip control module 7 (in particular, in the braking regeneration sub-module 40) to determine the regenerative braking torque command C-FR.

Figure 8:
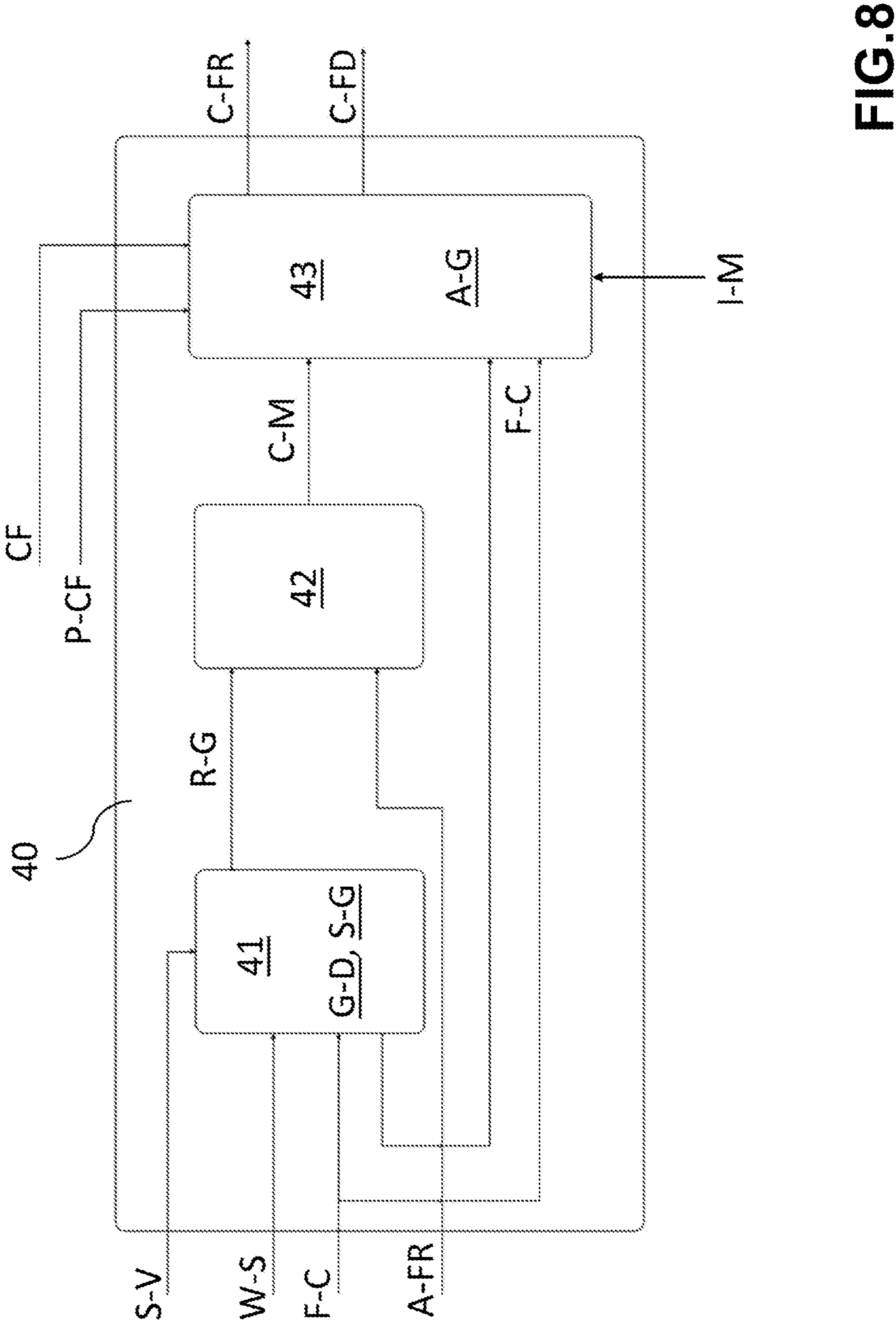
FIG. 8 shows, by means of a functional block chart, a second functional sub-block of the functional block in FIG. 6.

With reference now to FIG. 8, the braking regeneration sub-module 40 comprises a first processing block 41 configured to receive a subset of the first plurality of information P-I1.

Said subset comprises:

the wheel slip condition value W-S.

Furthermore, the first processing block 41 is configured to receive a subset of the second plurality of information P-I2.

Said subset comprises:

at least one vehicle status estimation value S-V.

Furthermore, the first processing block 41 is configured to receive the enabled wheel slip control confirmation value F-C.

The first processing block 41 is configured to determine a regeneration gain value R-G.

It is worth noting that the information about the regeneration gain value R-G makes it possible to determine the regenerative braking torque portion to be applied to the individual wheel.

In more detail, the first processing block 41 is configured to determine the regeneration gain value R-G as a linear combination of a first multiplicative factor G-D and a second multiplicative factor S-G.

The first multiplicative factor G-D is a function of quantities representative of the lateral dynamics of the vehicle 1.

These quantities can be detected by detecting devices (real or virtual sensors) installed on the vehicle, thus also on the corners (front or rear of the vehicle), but not necessarily only related to the braking system of the vehicle 1, or estimated by processing performed by other functional blocks of the system 100 or the vehicle 1 in general.

Examples of other functional blocks, contained in the vehicle status estimation sub-module 60, may be sub-modules configured to calculate vehicle quantities such as reference speed, wheel slip, vehicle acceleration, body slip angle, and so on.

The representative quantities of the lateral dynamics of the vehicle 1 comprise:

yaw rate of the vehicle;

body slip angle of the vehicle; for example, if a reference system with the origin at the center of gravity of the vehicle is considered, the body slip angle is the angle between the resultant velocity vector on the plane and the longitudinal axis of the above reference system. The body slip angle can also be defined by a trigonometric formula Atan (Vy/Vx), where Vy and Vx are the vectors that constitute the components of the "resultant velocity vector" on the XY plane in the aforesaid reference system;

lateral acceleration of the vehicle;

steering wheel angle.

The first multiplicative factor G-D is comprised between a respective maximum value, representative of a condition in which the braking maneuver takes place under conditions in which the lateral dynamics of the vehicle 1 and the quantities representing the lateral dynamics of the vehicle 1 assume significance, and a respective minimum value, representative of a condition in which the lateral dynamics of the vehicle 1 is not affected by the braking maneuver.

The second multiplicative factor S-G is a function of the wheel slip condition value W-S.

This value can be obtained from detections provided detecting devices (real or virtual sensors) installed on the vehicle, thus also on the corners (front or rear of the vehicle), but not necessarily only related to the braking system of the vehicle 1, or estimated by processing performed by other functional blocks of the system 100 or the vehicle 1 in general.

Examples of other functional blocks may be sub-modules configured to calculate vehicle quantities such as reference speed, wheel slip, vehicle acceleration, body slip angle, and so on.

In greater detail, the first processing block 41 is configured to determine the second multiplicative factor S-G by comparing the wheel slip condition value W-S with a first maximum threshold value W-Smax and a second minimum threshold value W-Smin to keep the determined second multiplicative factor S-G comprised between a set maximum value S-Gmax and a set minimum value S-Gmin.

$$\text{If } W{-}S\text{min} < W{-}S < W{-}S\text{max then}$$

$$S{-}G = (W{-}S\text{max} - W{-}S)/(W{-}S\text{max} - W{-}S\text{min})$$

$$\text{If } W{-}S < W{-}S\text{min then}$$

$$S{-}G = S{-}G\text{min}$$

$$\text{If } W{-}S > W{-}S\text{max then}$$

$$S{-}G = S{-}G\text{max}$$

It is worth noting that the determination of the second multiplicative factor S-G is performed, by the first processing block 41, during the braking of the vehicle 1, thus before wheel slip control activation.

Therefore, during the determination of the second multiplicative factor S-G, the enabled wheel slip control confirmation value F-C is set as a flag to "false".

The first processing block 41 is configured to determine the regeneration gain value R-G by multiplying the first multiplicative factor G-D and the second multiplicative factor S-G with each other.

$$R{-}G = G{-}D \times S{-}G$$

Referring again to FIG. 8, the braking regeneration sub-module 40 comprises a second processing block 42 arranged downstream of the first processing block 41.

The second processing block 42 is configured to receive as input the regeneration gain value R-G determined by the first processing block 41 and the available regenerative braking torque value A-FR.

The available regenerative braking torque value A-FR can be provided by a data processing unit present in an electric motor and battery control system present in the vehicle 1 or it can be provided by another functional block configured to contribute to the wheel slip control according to the present invention.

The second processing block 42 is configured to determine a maximum regenerative braking torque value C-M as a function of the regeneration gain value R-G determined by the first processing block 41 and the available regenerative braking torque value A-FR.

In greater detail, the second processing block 42 is configured to determine the maximum regenerative braking torque value C-M by multiplying the regeneration gain value R-G determined by the first processing block 41 and the available regenerative braking torque value A-FR.

$$C-M = S-G \times A-FR.$$

With reference again to FIG. 8, the braking regeneration sub-module 40 comprises a third processing block 43 (or mixing-blending-management block) arranged downstream of the second processing block 42.

The third processing block 43 is configured to receive as input the maximum regenerative braking torque value C-M determined by the second processing block 42, the enabled wheel slip control confirmation value F-C, the braking torque request CF to be applied to a corner of the vehicle 1, and the braking torque control component P-CF determined by the slip control block 70.

The third processing block 43 is configured to determine a third multiplicative factor A-G.

The third multiplicative factor A-G is a function of an estimated grip value I-A of the vehicle 1.

This value can be obtained from detections provided by detecting devices (real or virtual sensors) installed on the vehicle, thus also on the corners (front or rear of the vehicle), but not necessarily only related to the braking system of the vehicle 1, or estimated by processing performed by other functional blocks of the system 100 or the vehicle 1 in general.

Examples of other functional blocks may be sub-modules configured to calculate vehicle quantities such as reference speed, wheel slip, vehicle acceleration, body slip angle, and so on.

In greater detail, the third processing block 43 is configured to determine the third multiplicative factor A-G by comparing the grip estimate value I-A with a first maximum threshold value I-Amax and a respective second minimum threshold value I-Amin to keep the determined third multiplicative factor A-G comprised between a set maximum value A-Gmax and a set minimum value A-Gmin.

The set maximum value A-Gmax is the condition in which it is not necessary to have a significant reduction in regenerative braking torque regeneration capacity.

On the other hand, the set minimum value A-Gmin is the condition in which it is necessary to have the maximum reduction value of the regenerative braking torque regeneration capacity.

$$\text{If } I-A\text{min} < I-A < I-A\text{max then}$$

$$A-G = (A-G\text{max} - I-A)/(I-A\text{max} - I-A\text{min})$$

$$\text{If } I-A < I-A\text{min then}$$

$$A-G = A-G\text{min}$$

$$\text{If } I-A > I-A\text{max then}$$

$$A-G = A-G\text{max}$$

The third processing block 43 is configured to determine the regenerative braking torque command C-FR as a function of the braking torque request CF or P-CF braking torque control component based on the status of the enabling input signal I-M.

The enabling input signal I-M can come from other functional blocks of the system 100 or the vehicle 1 in general.

The status of the enabling input signal I-M can be enabled or disabled.

If the status of the enabling input signal I-M is disabled, the third processing block 43 is configured to determine the regenerative braking torque command C-FR as a function of the braking torque request CF.

If the status of the enabling input signal I-M is enabled, the third processing block 43 is configured to determine the regenerative braking torque command C-FR as a function of the braking torque control component P-CF.

In greater detail, if the enabling input I-M is disabled, the third processing block 43 is configured to determine the regenerative braking torque command C-FR as the minimum between the braking torque request CF and the maximum regenerative braking torque value C-M determined by the second processing block 42.

If I-M is disabled then $$C-FR = \min(CF, C-M)$$

If the enabling input I-M is enabled, the third processing block 43 is configured to determine the regenerative braking torque command C-FR as the minimum between the braking torque control component P-CF and the maximum regenerative braking torque value C-M determined by the second processing block 42.

If I-M is enabled then $$C-FR = \min(P-CF, C-M)$$

Furthermore, the third processing block 43 is further configured to determine a dissipative braking torque command C-FD as a function of the braking torque request CF and of the regenerative braking torque command C-FR determined by third processing block 43.

In greater detail, in an embodiment, the third processing block 43 is configured to determine the dissipative braking torque command C-FD as the difference between the braking torque request CF and the regenerative braking torque command C-FR determined by the third processing block 43.

$$C-FD = CF - C-FR.$$

A method 900 for controlling wheel slip with mixing (blending) of the dissipative braking torque and of the regenerative braking torque in a vehicle braking system with B-b-W technology, according to the present invention, will now be described with reference to the aforesaid figures and to the block diagram in FIG. 9.

It is worth noting that the components and information mentioned below with the description of the method have already been described previously with reference to the system 100 and will therefore not be repeated for the sake of brevity.

The method 900 comprises a symbolic step of starting ST.

The method 900 comprises a step of receiving 901, by a wheel slip control sub-module 30 of a wheel slip main control module 7 with mixing (blending) of the dissipative braking torque and the regenerative braking torque (hereafter also only main wheel slip control module 7) of an electronic control unit 5 of a braking system 2 of a vehicle 1, a first plurality of input information P-I1 for controlling wheel slip, hereinafter also simply first plurality of input information P-I1.

The first plurality of input information P-I1 was defined and described above.

The method 900 further comprises a step of determining 902, by the wheel slip control sub-module 30, a braking torque request CF to be applied to a corner of the vehicle 1 and a braking torque control component P-CF, based on the first plurality of input information P-I1 received.

The method 900 further comprises a step of providing 903, by the wheel slip control sub-module 30, the braking torque request CF to be applied to a corner of the vehicle 1, the determined braking torque control component P-CF and an enabled wheel slip control confirmation value F-C, to a braking regeneration sub-module 40 of the main wheel slip control module 7 of the electronic control unit 5 of the braking system 2 of the vehicle 1.

The method 900 further comprises a step of receiving 904, by the braking regeneration sub-module 40, a second plurality of input information P-I2 for controlling wheel slip, hereafter also only second plurality of input information P-I2.

The second plurality of input information P-I2 was defined and described above.

The method 900 further comprises a step of determining 905, by the braking regeneration sub-module 40, a regenerative braking torque command C-FR as a function of the braking torque request CF to be applied to the corner of the vehicle 1 or of the braking torque control component P-CF, based on a status of an input enabling signal I-M, and as a function of the second plurality of input information P-I2 and of the enabled wheel slip control confirmation value F-C received from the wheel slip control sub-module 30.

The enabling input signal I-M may either be determined during a step of calibrating, i.e. "a priori", by means of a static setting of the control module or determined by another control module in the electronic control unit 5 of the vehicle 1, which determines the operating mode.

In either case, the enabling input signal I-M can be:

the "disabling" value when the grip estimate value I-A is not present or is not considered reliable;

the "enabling" value in all other cases.

If the status of the enabling input signal I-M is disabled, the step of determining 905 is performed by the braking regeneration sub-module 40 to obtain the regenerative braking torque command C-FR as a function of the braking torque request CF.

If the status of the enabling input signal I-M is enabled, the step of determining 905 is performed by the braking regeneration sub-module 40 to obtain the regenerative braking torque command C-FR as a function of the braking torque control component P-CF.

The method 900 further comprises a step of determining 906, by the braking regeneration sub-module 40, a dissipative braking torque command C-FD as a function of the braking torque request CF and of the regenerative braking torque command C-FR determined by the braking regeneration sub-module 40.

The method 900 further comprises a symbolic step of ending ED.

Figure 9:
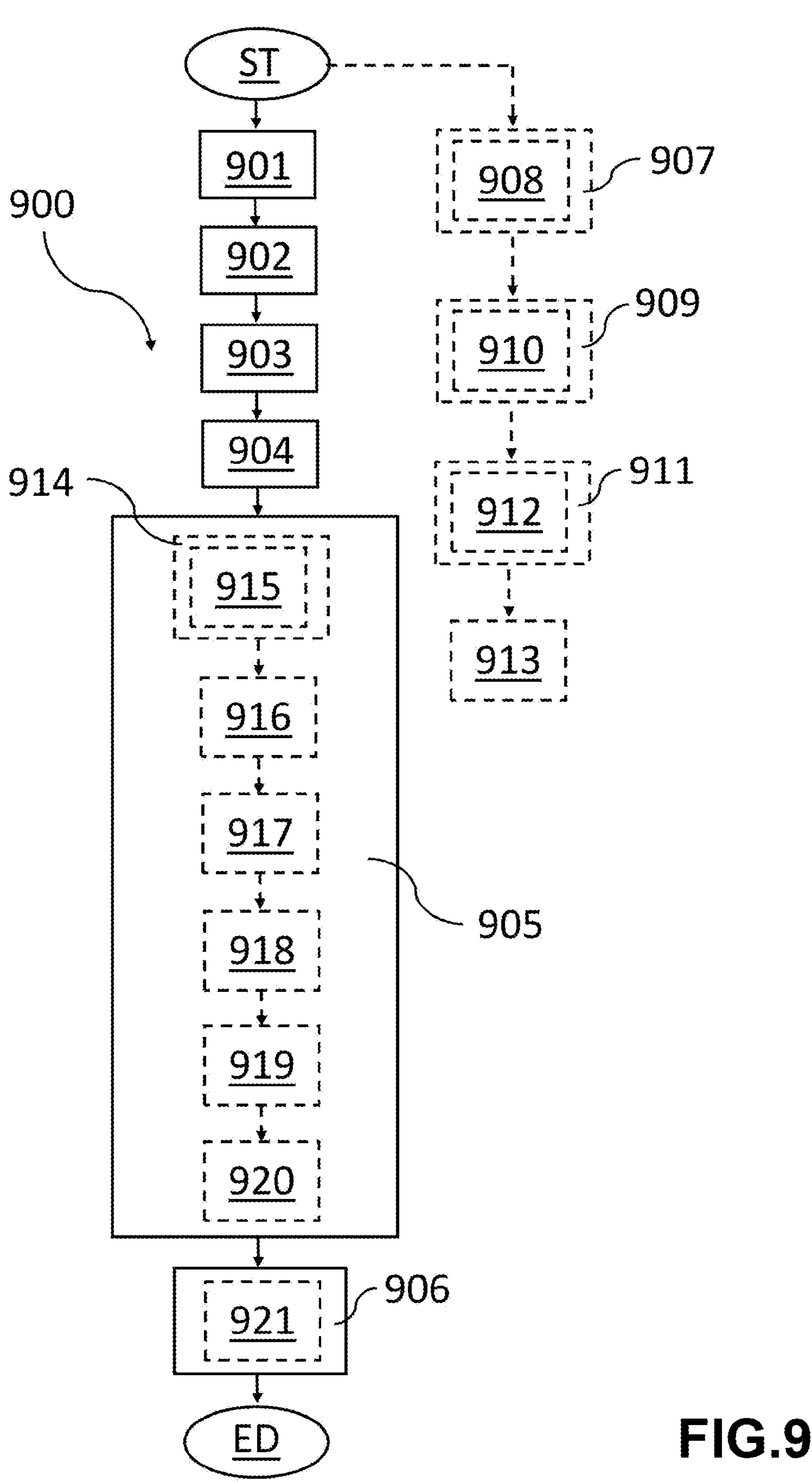
FIG. 9 shows, by means of a block diagram, a method for controlling wheel slip with mixing of the dissipative braking torque and of the regenerative braking torque in a braking system with B-b-W technology of a vehicle, according to an embodiment of the invention.

In an embodiment, in combination with the preceding one and shown with dashed lines in FIG. 9, the method 900 comprises a step of verifying 907, by the wheel slip control sub-module 30, the activation of the wheel slip control.

In an embodiment, in combination with the preceding one, the step of verifying 907 comprises a step of comparing 908, by a comparison block C1 of the slip control sub-module 30, a wheel slip condition value W-S with a wheel slip set-point value S-P.

According to an embodiment, in combination with the preceding one and shown with dashed lines in FIG. 9, the method 900 further comprises a step of performing 909, by a slip control block 70 of the slip control sub-module 30, following the activation of the wheel slip control, a step of initializing IZ the braking torque control component P-CF.

In an embodiment, shown with dashed lines in FIG. 9, the step of performing 909 the step of initializing IZ comprises a step of determining 910, by the slip control block 70 of the slip control sub-module 30, in the step of initializing, a value of the braking torque control component P-CF as a function of a dissipative braking torque feedback value F-FD, of a regenerative braking torque feedback value F-FR and of an initial value IQ.

The dissipative braking torque feedback value F-FD, the regenerative braking torque feedback value F-FR and the initial value IQ have been described above.

Furthermore, according to an embodiment, in combination with the preceding ones and shown with dashed lines in FIG. 9, the method 900 further comprises a step of performing 911, by a slip control block 70 of the slip control sub-module 30, following the activation of the wheel slip control and the detection of set discrete vehicle events E-S, a step of resetting AZ the braking torque control component P-CF.

In an embodiment, in combination with the preceding one and shown with dashed lines in FIG. 9, the step of performing 911 the step of resetting AZ comprises a step of adding 912, by an adder block C2 block of the wheel slip control sub-module 30, the dissipative braking torque feedback value F-FD to the regenerative braking torque feedback value F-FR.

In an embodiment, in combination with the preceding ones, the method 900 comprises, after the steps of initializing IZ and resetting AZ, a step of determining 913 in a closed loop, by the slip control block 70, the braking torque request CF and the braking torque control component P-CF minimizing the error between a wheel slip condition value W-S and a wheel slip set-point value S-P.

According to an embodiment, in combination with any one of the above, the step of determining 905 a regenerative braking torque command C-FR as a function of the braking torque request CF to be applied on the corner of the vehicle 1 or the braking torque control component P-CF comprises a step of determining 914, by a first processing block 41 of the braking regeneration sub-module 40, a regeneration gain value R-G.

In greater detail, in an embodiment, in combination with the preceding one, the regeneration gain value R-G is determined, by the first processing block 41 of the braking regeneration sub-module 40, as a linear combination of a first multiplicative factor G-D and a second multiplicative factor S-G.

In an embodiment, in combination with the preceding one, the regeneration gain value R-G is determined, by the first processing block 41, by multiplying the first multiplicative factor G-D and the second multiplicative factor S-G with each other.

The first multiplicative factor G-D is a function of quantities representative of the lateral dynamics of the vehicle 1.

The first multiplicative factor G-D is determined so that it is comprised between a respective maximum value, representative of a condition in which the braking maneuver takes place under conditions in which the lateral dynamics of the vehicle 1 and the quantities representing the lateral dynamics of the vehicle 1 assume significance, and a respective minimum value, representative of a condition in which the lateral dynamics of the vehicle 1 is not affected by the braking maneuver.

The second multiplicative factor S-G is a function of the wheel slip condition value W-S.

The step of determining 914 the regeneration gain value R-G comprises a step of determining 915, by the first processing block 41 of the braking regeneration sub-module 40, the second multiplicative factor S-G by comparing the wheel slip condition value W-S with a first maximum threshold value W-Smax and a second minimum threshold value W-Smin to keep the determined second multiplicative factor S-G comprised between a set maximum value S-Gmax and a set minimum value S-Gmin.

According to an embodiment, in combination with the preceding one and shown with dashed lines in FIG. 9, the step of determining 905 a regenerative braking torque command C-FR as a function of the braking torque request CF to be applied on the corner of the vehicle 1 or of the braking torque control component P-CF comprises a step of receiving 916 as input, by a second processing block 42 of the braking sub-module 40 arranged downstream of the first processing block 41, the regenerative regeneration gain value R-G determined by the first processing block 41 and an available regenerative braking torque value A-FR.

In this embodiment, the step of determining 905 a regenerative braking torque command C-FR as a function of the braking torque request CF to be applied to the corner of the vehicle 1 or of the braking torque control component P-CF comprises a step of determining 917, by the second processing block 42, a maximum regenerating braking torque C-M as a function of the regeneration gain value R-G determined by the first processing block 41 and the available regenerative braking torque value A-FR.

In an embodiment, in combination with the preceding one, the maximum regenerative braking torque value C-M is determined, by the second processing block 42, by multiplying the regeneration gain value R-G determined by the first processing block 41 and the available regenerative braking torque value A-FR by each other.

According to an embodiment, in combination with the preceding one and shown with dashed lines in FIG. 9, the step of determining 905 a regenerative braking torque command C-FR as a function of the braking torque request CF to be applied on the corner of the vehicle 1 or of the braking torque control component P-CF further comprises a step of receiving 918 as input, by a third processing block 43 of the braking regeneration sub-module 40 arranged downstream of the second processing block 42, the maximum regenerative braking torque value C-M determined by the second processing block 42, the enabled wheel slip control confirmation value F-C, the braking torque request CF to be applied on a corner of the vehicle 1, and the braking torque control component P-CF determined by the slip control block 70.

In this embodiment, the step of determining 905 a regenerative braking torque control C-FR as a function of the braking torque request CF to be applied on the corner of the vehicle 1 or of the braking torque control component P-CF further comprises a step of determining 919, by the third processing block 43, a third multiplicative factor A-G, the third multiplicative factor A-G being a function of an estimated grip value I-A of the vehicle 1.

In an embodiment, in combination with the preceding one, the third multiplying factor A-G is determined, by the third processing block 43 by comparing the grip estimate value I-A with a first maximum threshold value I-Amax and a respective second minimum threshold value I-Amin to keep the determined third multiplicative factor A-G comprised between a set maximum value A-Gmax and a set minimum value A-Gmin.

The set maximum value A-Gmax is the condition in which it is not necessary to have a significant reduction in regenerative braking torque regeneration capacity.

On the other hand, the set minimum value A-Gmin is the condition in which it is necessary to have the maximum reduction value of the regenerative braking torque regeneration capacity.

In this embodiment, the step of determining 905 a regenerative braking torque command C-FR as a function of the braking torque request CF to be applied to the corner of the vehicle 1 or of the braking torque control component P-CF further comprises a step of determining 920, by the third processing block 43, the regenerative braking torque command C-FR as a function of the braking torque request CF or of the braking torque control component P-CF based on a status of the input enabling signal I-M.

The input enabling signal I-M was described above.

If the status of the enabling input signal I-M is disabled, the regenerative braking torque command C-FR is determined, by the third processing block 43, as a function of the braking torque request CF.

If the status of the enabling input signal I-M is enabled, the regenerative braking torque command C-FR is determined, by the third processing block 43, as a function of the braking torque control components P-CF.

In greater detail, if the status of the enabling input signal I-M is disabled, the regenerative braking torque command C-FR is determined, by the third processing block 43, as the minimum between the braking torque request CF and the maximum regenerative braking torque value C-M determined by the second processing block 42.

If the status of the enabling input signal I-M is enabled, the regenerative braking torque command C-FR is determined, by the third processing block 43, as the minimum between the braking torque control component P-CF and the maximum regenerative braking torque value C-M determined by the second processing block 42.

In an embodiment, in combination with the preceding one and shown with dashed lines in FIG. 9, the step of determining 906 a dissipative braking torque command C-FD as a function of the braking torque request CF and of the regenerative braking torque command C-FR determined by the braking regeneration sub-module 40 further comprises a step of determining 921, by the third processing block 43, the dissipative braking torque command C-FD as a function of the braking torque request CF and of the regenerative braking torque command C-FR determined by the third processing block 43.

In greater detail, in an embodiment, in combination with the preceding one, the regenerative braking torque dissipative C-FD is determined, by the third processing block 43, as the difference between the braking torque request CF and the maximum regenerative braking torque value C-M determined by the third processing block 43.

An example of the implementation of the method for controlling wheel slip with mixing (blending) of dissipative braking torque and regenerative braking torque in a braking system with B-b-W technology of a vehicle, according to the present invention, will now be described with reference to the figures.

A wheel slip control sub-module 30 of a main wheel slip control module 7 with mixing of the dissipative braking torque and the regenerative braking torque of an electronic control unit 5 of a braking system 2 of a vehicle 1 receives a first plurality of input information P-I1 for controlling wheel slip (described above).

The wheel slip control sub-module 30 verifies the activation of the wheel slip control by comparing a wheel slip condition value W-S with a wheel slip set-point value S-P.

The wheel slip control sub-module 30 determines a braking torque request CF to be applied to a corner of the vehicle 1 and a braking torque control component P-CF, based on the first plurality of input information P-I1 received.

Following the activation of the wheel slip control, a wheel slip control block 70 of the wheel slip control sub-module 30 performs a step of initializing IZ the braking torque control component P-CF by determining a value of the braking torque control component P-CF as a function of a dissipative braking torque feedback value F-FD, of a regenerative braking torque feedback value F-FR, and of an initial value IQ.

Furthermore, following the activation of the wheel slip control and the detection of set discrete vehicle events E-S, the slip control block 70 of the slip control sub-module 30 performs a step of resetting AZ of the braking torque control component P-CF by adding a dissipative braking torque feedback value F-FD to a regenerative braking torque feedback value F-FR.

After the steps of initializing IZ and resetting AZ, the slip control block 70 determines the braking torque request CF and the braking torque control component P-CF in a closed loop by minimizing the error between the wheel slip condition value W-S and the wheel slip set-point value S-P.

The wheel slip control sub-module 30 provides the braking torque request CF to be applied to a corner of the vehicle 1, the determined braking torque control component P-CF, and an enabled wheel slip control confirmation value F-C, to a braking regeneration sub-module 40 of the main wheel slip control module 7 of the electronic control unit 5 of the braking system 2 of the vehicle 1.

The braking regeneration sub-module 40 receives a second plurality of input information P-I2 for controlling wheel slip (described above).

A first processing block 41 of the braking regeneration sub-module 40 determines a regeneration gain value R-G by multiplying a first multiplicative factor G-D (a function of representative quantities of lateral dynamics of the vehicle 1) and a second multiplicative factor S-G (a function of wheel slip condition value W-S).

The first multiplicative factor G-D is determined so that it is comprised between a respective maximum value, representative of a condition in which the braking maneuver takes place under conditions in which the lateral dynamics of the vehicle 1 and the quantities representing the lateral dynamics of the vehicle 1 assume significance, and a respective minimum value, representative of a condition in which the lateral dynamics of the vehicle 1 is not affected by the braking maneuver.

The second multiplicative factor S-G is determined by comparing the wheel slip condition value W-S with a first maximum threshold value W-Smax and a second minimum threshold value W-Smin to keep the determined second multiplicative factor S-G comprised between a set maximum value S-Gmax and a set minimum value S-Gmin.

A second processing block 42 of the braking regeneration sub-module 40 arranged downstream of the first processing block 41 receives as input the regeneration gain value R-G determined by the first processing block 41 and an available regenerative braking torque value A-FR.

The second processing block 42 determines a maximum regenerative braking torque value C-M by multiplying the regeneration gain value R-G determined by the first processing block 41 and the available regenerative braking torque value A-FR by each other.

A third processing block 43 of the braking regeneration sub-module 40 arranged downstream of the second processing block 42 receives as input the maximum regenerative braking torque value C-M determined by the second processing block 42, the enabled wheel slip control confirmation value F-C, the braking torque request CF to be applied to a corner of the vehicle 1, and the braking torque control component P-CF determined by the slip control block 70.

The third processing block 43 determines the third multiplicative factor A-G by comparing the grip estimate value I-A with a first maximum threshold value I-Amax and a respective second minimum threshold value I-Amin to keep the determined third multiplicative factor A-G comprised between a set maximum value A-Gmax and a set minimum value A-Gmin.

The set maximum value A-Gmax is the condition in which it is not necessary to have a significant reduction in regenerative braking torque regeneration capacity.

On the other hand, the set minimum value A-Gmin is the condition in which it is necessary to have the maximum reduction value of the regenerative braking torque regeneration capacity.

The third processing block 43 determines a regenerative braking torque C-FR command as a function of the braking torque request CF or the braking torque control component P-CF based on the status of the enabling input signal I-M.

The input enabling signal I-M was described above.

If the enabling input I-M is disabled, the third processing block 43 determines the regenerative braking torque command C-FR as a function of the braking torque request CF as the minimum between the braking torque request CF and the maximum regenerative braking torque value C-M determined by the second processing block 42.

If the status of the enabling input signal I-M is enabled, the third processing block 43 determines the regenerative braking torque command C-FR as a function of the braking torque control component P-CF as the minimum between the braking torque control component P-CF and the maximum regenerative braking torque value C-M determined by the second processing block 42.

The third processing block 43 determines the dissipative braking torque command C-FD as the difference between the braking torque request CF and the regenerative braking torque command C-FR determined by the third processing block 43 of the braking regeneration sub-module 40.

The regenerative braking torque control C-FR is provided to the electric motor of the corner of the vehicle 1.

The dissipative braking torque control C-FD is provided to the actuator of braking system 2 with B-b-W technology applied on the corner of the vehicle 1.

It is worth noting that the object of the present invention is fully achieved.

Indeed, the method and system of the present invention implement a more effective logic to define the braking torque distribution defined by wheel slip control logic between the two braking torque actuation systems, the regenerative one (electric motor) and the dissipative one (B-b-W actuator) by optimizing energy regeneration, stopping distances and braking stability.

The suggested mixing (blending) algorithm between the dissipative braking torque required from the B-b-W actuators and the regenerative braking torque required from the electric motor during braking at the limit of grip allows continuous modulation of braking torque to avoid tire locking and thus optimize stopping distances is fully satisfied.

The method and respective system according to the present invention take into account the presence of two different braking torque application systems (B-b-W actuator and electric motor) and make it possible to control the dissipative braking torque and regenerative braking torque under limit grip conditions, which allows the braking system with B-b-W technology to overcome the limitations of the "master cylinder" systems described above and allows the optimization of vehicle dynamics performance in terms of stopping distance, vehicle directionality and energy regeneration.

A person skilled in the art may make changes and adaptations to the embodiment of the method and respective system described above or can replace elements with others which are functionally equivalent to satisfy contingent needs without departing from the scope of protection of the appended claims. All the features described above as belonging to one possible embodiment may be implemented independently from the other described embodiments.

The invention claimed is:

1. A method for controlling wheel slip with mixing of a dissipative braking torque and a regenerative braking torque in a braking system with Brake-by-Wire (B-b-W) technology of a vehicle, comprising steps of:

receiving, by a wheel slip control sub-module of a main wheel slip control module with mixing of the dissipative braking torque and the regenerative braking torque of an electronic control unit of the braking system of the vehicle, a first plurality of input information for controlling the wheel slip;

determining, by the wheel slip control sub-module, a braking torque request to be applied to a corner of the vehicle and a braking torque control component, based on the first plurality of input information received;

providing, by the wheel slip control sub-module, the braking torque request to be applied to the corner of the vehicle, the braking torque control component, and an enabled wheel slip control confirmation value, to a braking regeneration sub-module of the main wheel slip control module with mixing of the dissipative braking torque and the regenerative braking torque of the electronic control unit of the braking system of the vehicle;

receiving, by the braking regeneration sub-module, a second plurality of input information for controlling the wheel slip;

determining, by the braking regeneration sub-module, a regenerative braking torque command as a function of the braking torque request to be applied to the corner of the vehicle or of the braking torque control component, based on a status of an enabling input signal, and as a function of the second plurality of input information and of the enabled wheel slip control confirmation value received from the wheel slip control sub-module, if the status of the enabling input signal is disabled, the step of determining the regenerative braking torque command is performed by the braking regeneration sub-module as a function of the braking torque request, if the status of the enabling input signal is enabled, the step of determining the regenerative braking torque command is performed by the braking regeneration sub-module as a function of the braking torque control component; and determining, by the braking regeneration sub-module, a dissipative braking torque command as a function of the braking torque request and of the regenerative braking torque command determined by the braking regeneration sub-module.

2. The method of claim 1, further comprising a step of verifying, by the wheel slip control sub-module, an activation of a wheel slip control.

3. The method of claim 2, further comprising a step of performing, by a slip control block of the wheel slip control sub-module, following the activation of the wheel slip control, a step of initializing the braking torque control component.

4. The method of claim 3, further comprising a step of performing, by the slip control block of the wheel slip control sub-module, following the activation of the wheel slip control and detection of set discrete vehicle events, a step of resetting the braking torque control component.

5. The method of claim 4, further comprising, after the steps of initializing and resetting the braking torque control component, a step of determining in a closed loop, by the slip control block, the braking torque request and the braking torque control component minimizing an error between a wheel slip condition value and a wheel slip set-point value.

6. The method of claim 2, wherein the step of verifying comprises a step of comparing, by a comparison block of the wheel slip control sub-module, a wheel slip condition value with a wheel slip set-point value.

7. The method of claim 1, wherein the step of determining the regenerative braking torque command as the function of the braking torque request to be applied to the corner of the vehicle or of the braking torque control component comprises a step of determining, by a first processing block of the braking regeneration sub-module, a regeneration gain value, the regeneration gain value being determined, by the first processing block of the braking regeneration sub-module, as a linear combination of a first multiplicative factor and a second multiplicative factor, the first multiplicative factor being a function of quantities representative of lateral dynamics of the vehicle, and the second multiplicative factor being a function of a wheel slip condition value.

8. The method of claim 7, wherein the step of determining the regenerative braking torque command as the function of the braking torque request to be applied to the corner of the vehicle or of the braking torque control component further comprises steps of:

receiving as input, by a second processing block of the braking regeneration sub-module arranged downstream of the first processing block, the regeneration gain value determined by the first processing block and an available regenerative braking torque value; and determining, by the second processing block, a maximum regenerative braking torque value as a function of the regeneration gain value determined by the first processing block and the available regenerative braking torque value.

9. The method of claim 8, wherein the step of determining the regenerative braking torque command as the function of the braking torque request to be applied to the corner of the vehicle or of the braking torque control component further comprises steps of:

receiving as input, by a third processing block of the braking regeneration sub-module arranged downstream of the second processing block, the maximum regenerative braking torque value determined by the second processing block, the enabled wheel slip control confirmation value, the braking torque request to be applied to the corner of the vehicle, and the braking torque control component determined by a slip control block; and determining, by the third processing block, a third multiplicative factor, the third multiplicative factor being a function of a grip estimate value of the vehicle.

10. The method of claim 9, wherein the step of determining the regenerative braking torque command as the function of the braking torque request to be applied to the corner of the vehicle or of the braking torque control component further comprises a step of determining, by the third processing block, the regenerative braking torque command as a function of the braking torque request or of the braking torque control component based on the status of the enabling input signal, if the status of the enabling input signal is disabled, the regenerative braking torque command is determined, by the third processing block, as the function of the braking torque request, if the status of the enabling input signal is enabled, the regenerative braking torque command is determined, by the third processing block, as the function of the braking torque control component, if the status of the enabling input signal is disabled, the regenerative braking torque command is determined, by the third processing block, as a minimum between the braking torque request and the maximum regenerative braking torque value determined by the second processing block, and if the status of the enabling input signal is enabled, the regenerative braking torque command is determined, by the third processing block, as a minimum between the braking torque control component and the maximum regenerative braking torque value determined by the second processing block.

11. The method of claim 10, wherein the step of determining the dissipative braking torque command as the function of the braking torque request and of the regenerative braking torque command determined by the braking regeneration sub-module further comprises a step of determining, by the third processing block, the dissipative braking torque command as a function of the braking torque request and of the regenerative braking torque command determined by the third processing block, the dissipative braking torque command being determined, by the third processing block, as a difference between the braking torque request and the regenerative braking torque command determined by the third processing block.

12. A system for controlling wheel slip with mixing of a dissipative braking torque and a regenerative braking torque in a braking system with Brake-by-Wire (B-b-W) technology of a vehicle, the system comprising:

an electronic control unit of the vehicle, the electronic control unit comprising a main wheel slip control module with mixing of the dissipative braking torque and the regenerative braking torque, the main wheel slip control module comprising a wheel slip control sub-module and a braking regeneration sub-module;

a traction and regenerative braking control module operatively connected to the electronic control unit; and a sensor unit operatively connected to the electronic control unit;

the wheel slip control sub-module of the main wheel slip control module with mixing of the dissipative braking torque and the regenerative braking torque of the electronic control unit of the braking system of the vehicle being configured to:

receive a first plurality of input information for controlling the wheel slip;

determine a braking torque request to be applied to a corner of the vehicle and a braking torque control component, based on the first plurality of input information received;

provide the braking torque request to be applied to the corner of the vehicle, the braking torque control component, and an enabled wheel slip control confirmation value, to a braking regeneration sub-module of the main wheel slip control module with mixing of the dissipative braking torque and the regenerative braking torque of the electronic control unit of the braking system of the vehicle;

the braking regeneration sub-module being configured to:

receive a second plurality of input information for controlling the wheel slip;

determine a regenerative braking torque command as a function of the braking torque request to be applied to the corner of the vehicle or of the braking torque control component, based on a status of an enabling input signal, and as a function of the second plurality of input information and of the enabled wheel slip control confirmation value received from the wheel slip control sub-module, the braking regeneration sub-module performing the step of determining the regenerative braking torque command as the function of the braking torque request if the status of the enabling input signal is disabled, the braking regeneration sub-module performing the step of determining the regenerative braking torque command as the function of the braking torque control component if the status of the enabling input signal is enabled; and the braking regeneration sub-module being further configured to determine a dissipative braking torque command as a function of the braking torque request and of the regenerative braking torque command determined by the braking regeneration sub-module.

* * * * *